Sept. 30, 1947.                D. D. GRIEG                      2,428,021
                     ELECTRICAL WAVE ANALYZING SYSTEM
                        Filed Feb. 13, 1943          2 Sheets-Sheet 1
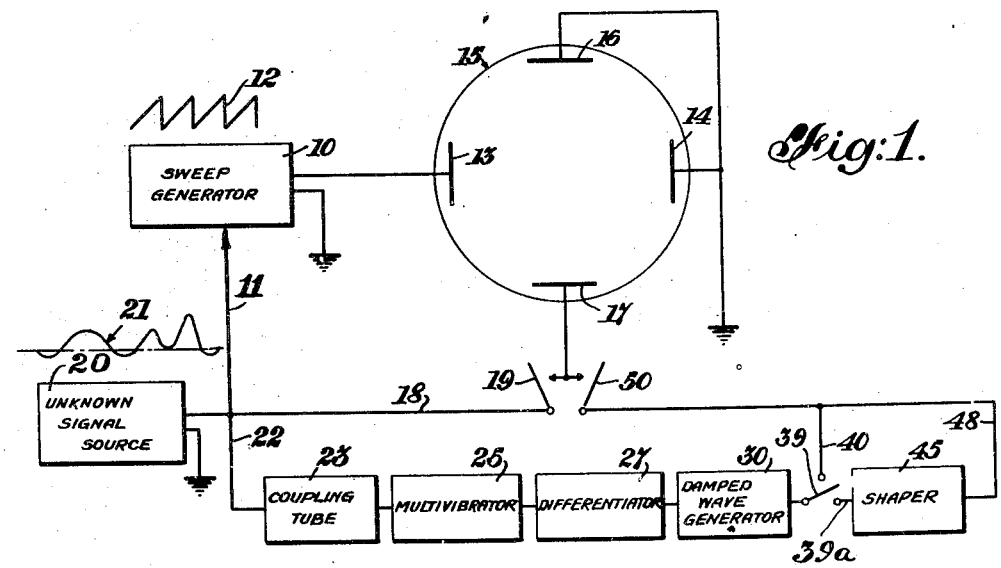
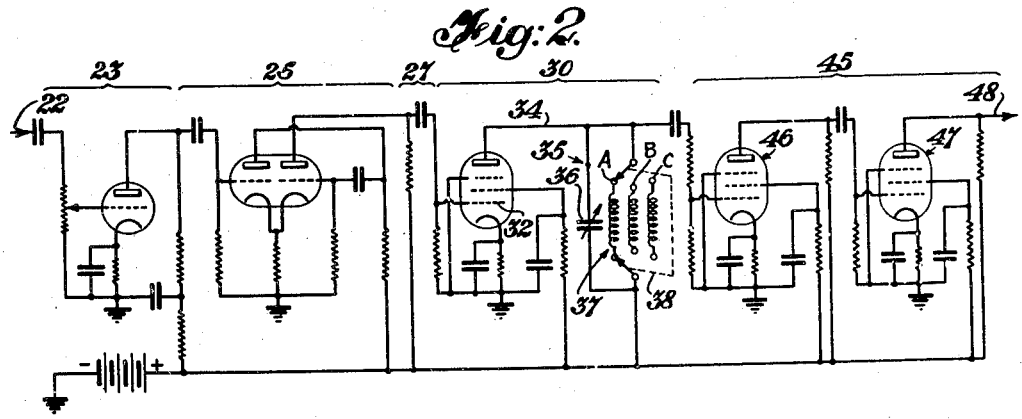
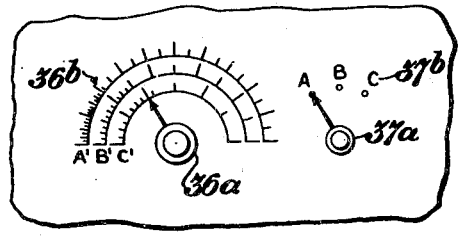
INVENTOR.
DONALD D. GRIEG
BY *Percy P. Lantz*
ATTORNEY

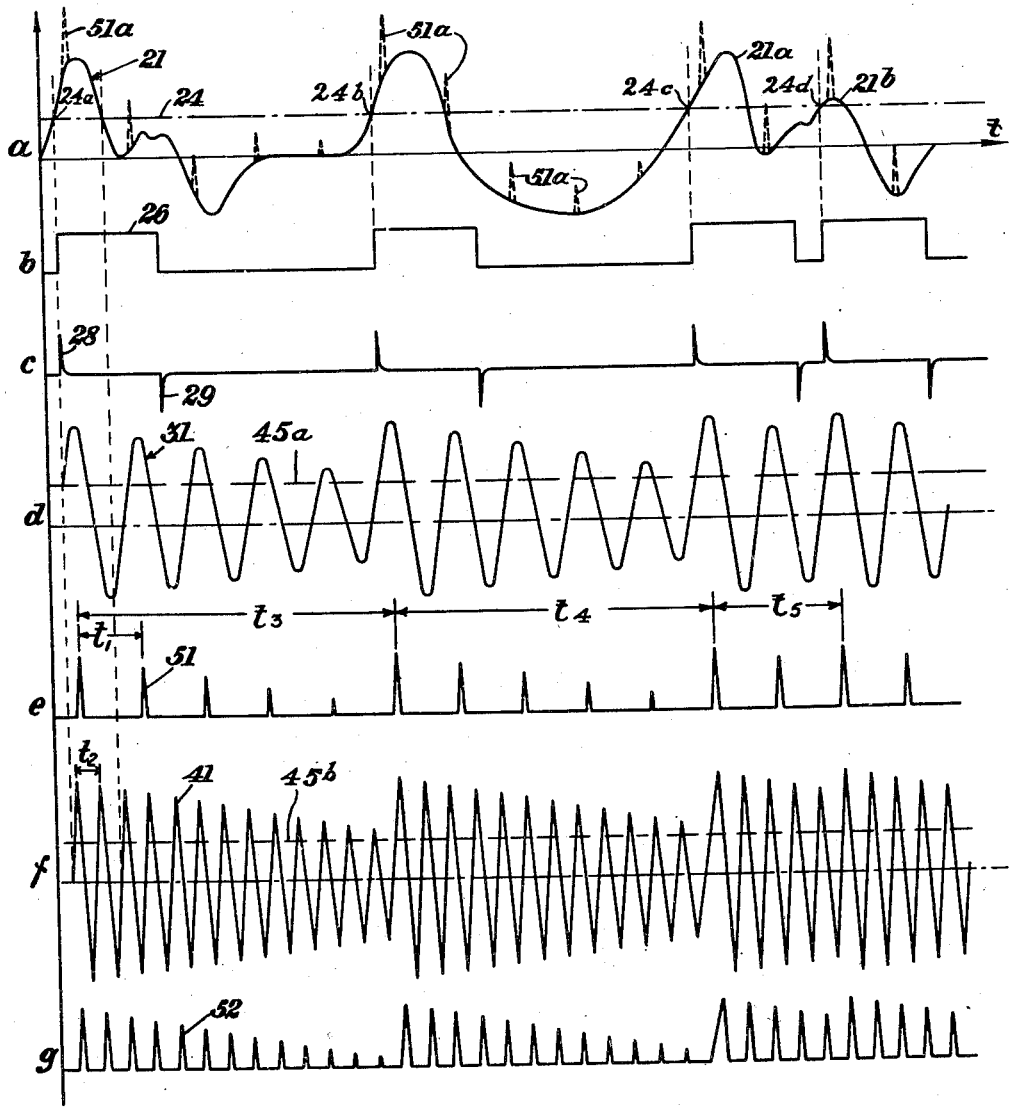

Patented Sept. 30, 1947

2,428,021

UNITED STATES PATENT OFFICE 2,428,021

ELECTRICAL WAVE ANALYZING SYSTEM

Donald D. Grieg, Forest Hills, N. Y., assignor to Federal Telephone and Radio Corporation, Newark, N. J., a corporation of Delaware Application February 13, 1943, Serial No. 475,734

14 Claims. (Cl. 171—95)

This invention relates to electrical wave analyzing systems and more particularly to the calibration and measurement of the timing or frequency of periodic and non-periodic electrical wave phenomena and the duration of wave and signal formations.

There exist many systems for measuring frequency and timing by both direct and comparison methods. Frequency can be measured by comparison with both primary and secondary standards, by the use of wave meters, heterodyne frequency meters, or for very high frequencies by a Lecher wire system. Timing, that is the determination of the interval of time between wave formations or signals under observation presents greater difficulties of measurement but may be determined by similar methods of comparison with standards. Of the several methods of timing comparison heretofore available, the Lissajous method used in conjunction with the cathode ray oscilloscope is the most satisfactory.

According to the Lissajous method, a signal of unknown frequency is impressed on one set of deflection plates of the cathode ray oscillograph, a signal of known frequency is impressed on the second set of plates and the resulting pattern read to give the ratio of known to unknown frequency. An alternative variation of the Lissajous method is the use of an intermediary signal such as the cathode ray tube saw-tooth sweeping voltage to obtain a pattern with the unknown signal and then comparing this with the corresponding pattern obtained with a signal of known frequency. For ease of comparison of timing these two patterns may be superimposed simultaneously.

Several difficulties arise with this method of measurement which seriously interfere with the accuracy and convenience of the method. Generally, the unknown signal is obtained from a source which is not common to the signal with which it is compared. Due to the asynchronous relation of the two signals the pattern obtained on the cathode ray screen is not stationary resulting in blurring and wandering effects which adversely affects the accuracy of observation.

Another effect is observed when a sweep voltage common to both signals is utilized for comparison purposes. The relationship between amplitude and wave-form of the known and unknown signals effect the internal synchronization of the cathode ray tube differently. Hence if the sweep voltage is calibrated for the known signal it will not necessarily remain calibrated for comparison with the unknown signals.

Where non-periodic wave-forms are being observed these effects due to non-synchronization are still further increased which makes even a rough approximation of timing and measurement of wave formation duration difficult.

Another shortcoming of the above-described method is the difficulty of determining accurately the ratio of unknown to known signal timing even for a stationary pattern. The source of the known comparison signal is generally sinusoidal. When this sinusoid is compared directly with a complex wave-form the resultant pattern is a complex one which varies with the wave-shape being compared and thus is difficult to interpret properly. If the alternate method of calibration of an intermediary sweep voltage is used, the sinusoids do not provide an accurate comparison pattern for close measurement due to the slow rate of change of the sinusoid wave-shape.

It is an object of my invention to provide a method and means of calibrating wave formations which overcomes substantially the foregoing disadvantages of the prior existing calibration systems.

Another object of my invention is to provide a method and means for synchronizing a measuring medium with unknown signals regardless of the wave-shape or the periodicity of the signals.

The above and other objects of the invention will become more apparent upon consideration of the following detailed description to be read in connection with the accompanying drawings, in which:

Fig. 1 is a block diagram of a calibrating system according to my invention;

Fig. 2 is a schematic wiring diagram of a portion of the system by which calibrating pulses are produced;

Fig. 3 is a graphical illustration of the operating features of the invention; and Fig. 4 is a fragmentary view in elevation of a panel showing certain of the controls for the system.

Referring to Fig. 1, the calibrating system comprises a sweep generator 10 adapted to produce a saw-tooth sweep potential 12 for deflecting plates 13 and 14 of a cathode ray oscillograph 15. The wave phenomena to be calibrated may be any unknown signal source 20 having an unknown wave formation 21. The generator 10 is synchronized to the wave phenomena of source 20 in known manner by connection 11. The system is provided with an input connection 18 having a switch 19 by which the wave formation can be applied to the deflecting plates 16 and 17 of the oscillograph 15 to produce a pattern of the wave phenomena. The operation of the sweep generator 10 may be manually adjusted for synchronism with the unknown wave source 20 or it may be controlled automatically synchronously therewith in any suitable manner whereby the sweeps of the oscillograph ray are timed to the recurring and non-recurring wave portions.

For calibration purposes, I use the unknown wave formation as a basis for the generation of the calibration pulses. This is accomplished as shown in Figs. 1, 2 and 3 by applying energy of the unknown wave of the source 20 to the input 22 of a coupling tube 23. The circuit of the coupling tube is adjustable at this grid input connection for operation at low plate voltage to provide selected clipping and shaping operations of the wave-form at selected amplitude levels such as indicated by clipping level 24 on curve a of Fig. 3. The output of the coupling tube 23 is utilized to synchronize a multivibrator 25 of the character adapted to be triggered by the clipped wave-form at points 24a, 24b, 24c, 24d where the wave 21 crosses the clipping level 24. This triggers the multivibrator from one state to a second state of operation, the multivibrator being arranged to return to the first state of operation after a predetermined time interval. This produces a rectangular pulse 26 (curve b) of a given duration. The duration of these pulses may be changed depending upon the wave formation to be calibrated. The duration is selected preferably so that a rectangular pulse is produced whenever the wave form exceeds the amplitude level 24.

The rectangular pulses 26 are differentiated by a differentiator circuit 27 to produce alternate positive and negative pulses 28 and 29. The positive pulses 28 thus coincide with the leading edges of the pulses 26 and are timed with the wave formation as determined by the points where the wave exceeds the clipping level 24. These positive pulses 28 are utilized to produce damped oscillation 31 by applying them to the grid 32 of a damped wave generator 30. The damped wave generator is operated class "C" and contains in the anode circuit 34 a resonant circuit 35 comprising a variable condenser 36 and a variable inductance 37 preferably formed of a plurality of inductance coils A, B and C. These coils A, B and C are selectively connected in circuit by a switch connection 38.

The resonant circuit 35 is adapted to be tuned within certain frequency limits by the condenser 36 in conjunction with the coils A, B and C. For example, coil A may be selected of an inductance value to give the dial of the condenser 35 an adjustment range to produce oscillations varying in period from say 2 to 5 microseconds, coil B from 5 to 10 microseconds and coil C from 10 to 20 microseconds. It will be understood, of course, that these values are given by way of example only and may be varied considerably by selection of inductance coils and also by the capacity of the condenser 36. It will also be understood that while I have shown 3 inductance coils a lesser or greater number of coils may be used if desired.

In Fig. 4, controls 36a and 37a together with appropriate indicia 36b and 37b are shown for the condenser 36 and the coils A, B and C. Thus, when coil A is connected in circuit as indicated by the control 37a, the scale A' of the indicia 36b will give the period of the oscillations produced by the circuit 35. Likewise, scales B' and C' are used when the corresponding coils are connected in circuit.

Assuming that the oscillations 31 are produced by one of the coils such as coil C, an oscillation of higher frequency 41 (curve f) will be produced by replacing coil C by coil A or B, as the case may be. The period of the individual timing cycle of a given oscillation such as 31 or 41 is independent of the frequency of the input pulses 28. By proper selection of one of the inductances 37 and adjustment of the condenser 36 oscillations of a suitable calibrating frequency are obtainable. These oscillations may be used directly for calibration purposes or pulse markers may be produced therefrom for the same and other purposes. The oscillations may be applied to the deflecting plates 16 and 17 by switch connections 39, 40. When the oscillations are used, they preferably are applied to the oscilloscope alternately with the unknown wave by first manually closing switch 19 whereby the period or wave duration 21 may be marked or otherwise noted on the screen and then by opening switch 19 and closing switch 50 (switch connections 39, 39a being closed) thereby applying oscillations 31 or 41, as may be desired, upon the screen to observe the number of oscillations occurring during the particular wave portion noted. The measurement in this case would be between points 24a, 24b; 24b, 24c; 24c, 24d; for example, since these are the points which correspond with the initiation of the damped oscillatory waves. It is not best to superimpose the oscillations upon the wave pattern because the oscillations tend to distort the pattern.

A shaper circuit 45 is provided comprising stages 46 and 47 whereby the damped waves 31 are clipped at a high level 45a so that only the wave tips 51 occurring above the selected clipping level are produced at the output 48. The output of the final stage 47 is at low impedance permitting the use of connecting cables without deterioration of the wave-forms.

The output 48 is connected by a switch connection 50 to the deflecting plates 16 and 17 of the oscillograph. If desired, the wave pattern 21 and the calibrating pulses 51 may be applied to the screen of the oscillograph alternately as described above in connection with the oscillations of waves 31 and 41 or in superposition. The alternate application of wave 21 and pulses 51 or 52 is brought about as follows: For one position of the switches, switch contacts 39, 39a are closed, switch 19 is closed and switch 50 is opened. This provides a circuit for applying wave 21 only to the vertical deflecting plates of the oscillograph 15. For the alternate position of the switches, switch contacts 39, 39a are kept closed, switch 19 is opened and switch 50 is closed thereby providing a circuit for applying pulses 51 or 52 to the vertical deflecting plates of the oscillograph. If in the first mentioned positions of switches 19 and 50, switch contacts 39, 39a, are opened, then wave 31 or 41, as the case may be, is applied instead of pulses 51 or 52. In case of alternate applications of wave 21 and pulses 51 or 52, the pulses, of course, will not occur on the screen in superposed position relative to wave 21 but will occur on the datum line normally produced by the sweep potential. The pulses 51a of curve a are pulses 51 superposed in broken lines for clearness of illustration on wave 21. In actual practice, the tracing of the curve 21 will be altered by the pulses 51a but since the pulses are sharp and of short duration, they do not alter materially the general shape of the wave. By proper adjustment of controls 36a and 37a (Fig. 4) a suitable pulse frequency can be selected whereby the number of pulses 51a occurring within a wave formation multiplied by the proper scale reading at 36b will give in microseconds the duration of the wave formation or signal pulse of the pattern. Should the wave formations not be periodic, the trains of pulses will be of different lengths. This is illustrated in Fig. 3 by the pulse formations 21a and 21b and also by the differences in the signal periods as indicated by intervals $t_3$, $t_4$ and $t_5$. These different wave-forms or signal increments may be measured by the same method.

Should the wave formation comprise narrow pulsations, it will be desirable to have the calibration pulse period small. This may be accomplished by increasing the frequency of the oscillations such as indicated by the oscillations 41 in comparison with the oscillations 31. This reduces the period of the calibration pulses as indicated by the pulses 52 (curve g), obtained by clipping oscillations 41 along level 45b, so that a larger number of pulses will occur for a given duration. The finer calibration pulses also provide for a more exact measurement of the wave formations.

It will be clear from the foregoing description that my method of calibrating unknown wave phenomena overcomes substantially the many disadvantages of the prior existing calibration methods. Since the calibration pulses of my method are synchronized automatically with the periods of the unknown wave-form and further since the frequency of the calibration pulses is adjustable independent of the unknown waveform, precise and accurate measurement of even complex wave-forms is now obtainable.

While I have disclosed the principles of my invention in connection with specific apparatus, it will be understood that the illustration is given by way of example only and not as limiting the scope of the invention as set forth in the objects of the invention and the appended claims.

I claim:

1. A method of calibrating wave phenomena comprising producing in response to the wave phenomena a train of damped oscillations of a given frequency each time the wave phenomena exceeds a given amplitude, producing a pattern of the oscillations thereby indicating by said pattern the trains of damped oscillations corresponding to the periods of the wave phenomena as determined by the level of said given amplitude, and controlling the damped oscillations producing operation for production at different given amplitudes relative said wave phenomena for producing patterns of oscillations according to the formation of said wave phenomena at the said different given amplitudes.

2. The method defined in claim 1 in combination with the step of counting the number of oscillations occurring during a particular wave formation, and multiplying the number of oscillations by a predetermined value to determine the duration of the wave formation.

3. The method defined in claim 1 in combination with a step of generating a pulse for each oscillation whereby superposition of the pulses on the wave phenomena provides a minimum of wave distortion.

4. A system for calibrating wave phenomena comprising a cathode ray oscillograph, means to produce a sweep potential therefor in synchronism with said wave phenomena, means to produce in response to the wave phenomena a train of damped oscillations of a given frequency each time the wave exceeds a given amplitude, means to control the damped oscillations producing means for operations at different amplitudes relative said wave phenomena, a deflecting circuit for the oscillograph, and means to apply the oscillations to the deflecting circuit to indicate the trains of oscillations thus produced and thereby determine the recurring and duration characteristics of the wave.

5. The system defined in claim 4 wherein the means to produce the damped oscillations comprises a tunable resonant circuit.

6. The system defined in claim 4 wherein the means to produce the damped oscillations comprises a tunable resonant circuit having a variable condenser and a plurality of inductances and means for selectively connecting the inductances into said resonant circuit.

7. A system for calibrating wave phenomena comprising a cathode ray oscillograph, means to produce a sweep potential therefor in synchronism with said wave phenomena, means to produce in response to the wave phenomena a train of damped pulse of a given frequency each time the wave exceeds a given amplitude, means to control the damped oscillations producing means for operations at different amplitudes relative said wave phenomena, a deflecting circuit for the oscillograph, and means to apply the pulses to the deflecting circuit to indicate the trains of pulses thus produced and thereby determine the recurring characteristics of the wave.

8. The system defined in claim 7 in combination with means to apply the wave phenomena to said deflecting circuit to determine the wave formation thereof by the number of pulses occurring during the formation.

9. The system for calibrating wave phenomena comprising a cathode ray oscillograph, means to produce a sweep potential therefor in synchronism with said wave phenomena, means to produce a rectangular pulse in response to the wave phenomena whenever the wave formation thereof exceeds a given amplitude, means for determining the value of said given amplitude means to differentiate the rectangular pulse to produce a positive pulse timed substantially with the instant the wave exceeds said amplitude, means responsive to the positive pulses to produce a train of pulses of a given frequency, a deflecting circuit for the oscillograph, means to apply the wave phenomena to the deflecting circuit to produce a pattern of the wave formation on the oscillograph, and means to apply the trains of pulses to said deflecting circuit for measurement of the wave pattern.

10. The system defined in claim 9 wherein the means to produce the trains of pulses comprises a tunable circuit whereby the frequency of the pulses may be varied.

11. The system defined in claim 9 wherein the means to produce the trains of pulses comprises a tunable resonant circuit having a variable condenser and a plurality of inductances and means for selectively connecting the inductances in said circuit.

12. The system defined in claim 9 wherein the means to produce the trains of pulses comprises a tunable resonant circuit to produce a train of damped oscillations and means to clip and shape the oscillations so as to produce a pulse for each cycle of the oscillations.

13. A system in accordance with claim 4 wherein the means acting in response to the wave phenomena to produce oscillations includes means for producing from said wave phenomena a rectangular pulse of a given duration, means to differentiate said pulse to produce an impulse timed substantially with the instant the wave exceeds said amplitude, and means for applying each said impulse to the production of a said train of damped oscillations.

14. A system in accordance with claim 4 wherein the means acting in response to the wave phenomena to produce oscillations includes a multivibrator for producing from said wave phenomena rectangular pulse of a given duration, means to differentiate said pulse to produce an impulse timed substantially with the instant the wave exceeds, said amplitude, and means for applying each said impulse to the production of a said train of damped oscillations.

DONALD D. GRIEG.

REFERENCES CITED

The following references are of record in the file of this patent:

UNITED STATES PATENTS

| Number | Name | Date |
| --- | --- | --- |
| 2,241,256 | Gould | May 6, 1941 |
| 2,286,804 | Browne et al. | June 16, 1942 |
| 2,121,359 | Luck et al. | June 21, 1938 |
| 2,234,830 | Norton | Mar. 11, 1941 |
| 1,708,530 | Von Arco | Apr. 9, 1929 |
| 1,773,556 | Von Arco | Aug. 9, 1929 |
| 1,908,249 | Hund | May 9, 1933 |
| 2,063,025 | Blumlein | Dec. 8, 1936 |
| 2,086,918 | Luck | July 13, 1937 |
| 2,103,090 | Plebanski | Dec. 21, 1937 |
| 2,178,074 | Jakel et al. | Oct. 31, 1939 |
| 2,320,476 | Schrader et al. | June 1, 1943 |